United States Patent
Wagner

(10) Patent No.: US 11,572,916 B2
(45) Date of Patent: Feb. 7, 2023

(54) CENTERING SCREW FOR ALIGNING TWO ELEMENTS RELATIVE TO EACH OTHER, CENTERING ASSEMBLY

(71) Applicant: Robert Bosch GmbH, Stuttgart (DE)

(72) Inventor: Marcus Wagner, Schwaigern (DE)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 16/594,870

(22) Filed: Oct. 7, 2019

(65) Prior Publication Data

US 2020/0116189 A1    Apr. 16, 2020

(30) Foreign Application Priority Data

Oct. 11, 2018 (DE) .......................... 102018217375.3

(51) Int. Cl.
*F16B 35/06* (2006.01)
*F16B 23/00* (2006.01)
*F16B 41/00* (2006.01)

(52) U.S. Cl.
CPC .............. *F16B 35/06* (2013.01); *F16B 23/00* (2013.01); *F16B 41/00* (2013.01)

(58) Field of Classification Search
CPC ...... F16B 5/0275; F16B 5/0283; F16B 23/00; F16B 35/041; F16B 35/06; F16B 35/065; F16B 41/00
USPC .......................... 411/378, 388–389, 411, 424
See application file for complete search history.

(56) References Cited

U.S. PATENT DOCUMENTS

| 4,223,585 A * | 9/1980 | Barth ..................... F16B 35/065 411/389 |
| 5,649,798 A * | 7/1997 | Ito ........................... F16B 43/00 411/533 |
| 5,772,252 A * | 6/1998 | Malani .................. F16L 25/065 411/389 |
| 6,592,311 B2 * | 7/2003 | Wojciechowski .... F16B 37/068 411/389 |
| 8,641,343 B2 * | 2/2014 | Mitrovic ............... F16B 37/122 411/338 |

(Continued)

FOREIGN PATENT DOCUMENTS

| CN | 203362772 U | 12/2013 |
| CN | 207033939 U | 2/2018 |

(Continued)

*Primary Examiner* — Roberta S Delisle
(74) *Attorney, Agent, or Firm* — Norton Rose Fulbright US LLP; Gerard Messina

(57) ABSTRACT

A centering screw for aligning two elements, particularly a workpiece and a carrier, relative to each other, the centering screw having a first end section with a first outside diameter and a first length, and a second end section with a second outside diameter and a second length, the first end section having a first thread, at least in sections, and a cone being provided for the centering. In this case, the centering screw has the cone in an intermediate section between the first end section and the second end section, the cone having a diameter changing along the intermediate section, the diameter at an end of the cone facing away from the first end section being larger than the first outside diameter, and the end of the cone facing away from the first end section being assigned an axial stop facing away from the first end section.

14 Claims, 4 Drawing Sheets

(56) References Cited

U.S. PATENT DOCUMENTS

| | | | | |
|---|---|---|---|---|
| 8,920,091 | B2* | 12/2014 | Heinrich | F16B 5/0275 411/389 |
| 9,303,675 | B2* | 4/2016 | Brunner | F16B 11/006 |
| 2003/0206787 | A1* | 11/2003 | Huang | F16B 25/0068 411/412 |
| 2007/0053766 | A1* | 3/2007 | Lin | F16B 39/282 411/389 |
| 2011/0158766 | A1 | 6/2011 | Mitrovic | |
| 2011/0228451 | A1* | 9/2011 | Chiu | F16B 35/041 361/679.01 |
| 2013/0232769 | A1* | 9/2013 | Wooten | F16B 25/0031 411/389 |
| 2017/0226731 | A1* | 8/2017 | Chamberlain | E04B 5/40 |

FOREIGN PATENT DOCUMENTS

| | | |
|---|---|---|
| EP | 2886738 A1 | 6/2015 |
| JP | 2015183700 A | 10/2015 |

* cited by examiner

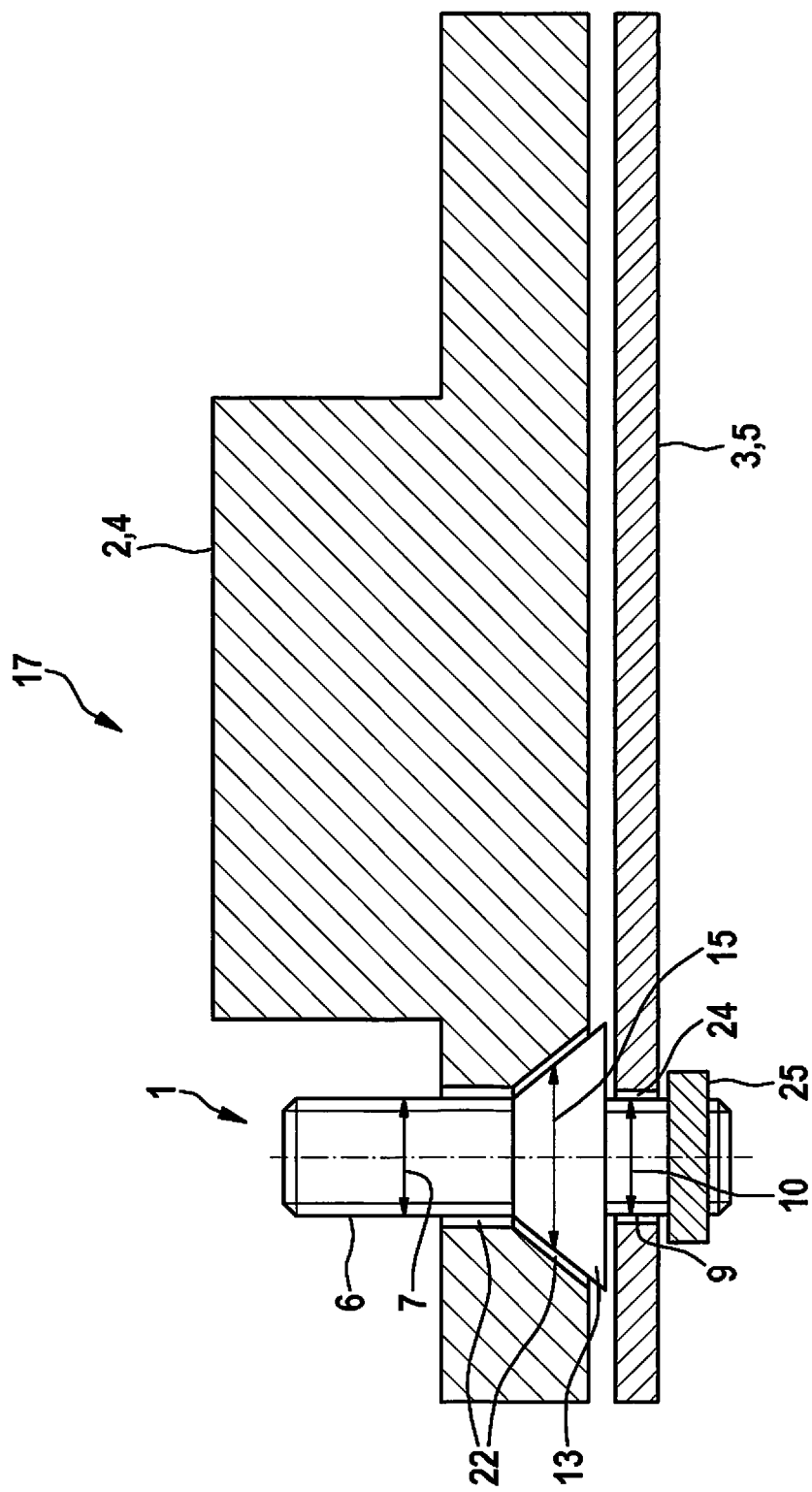

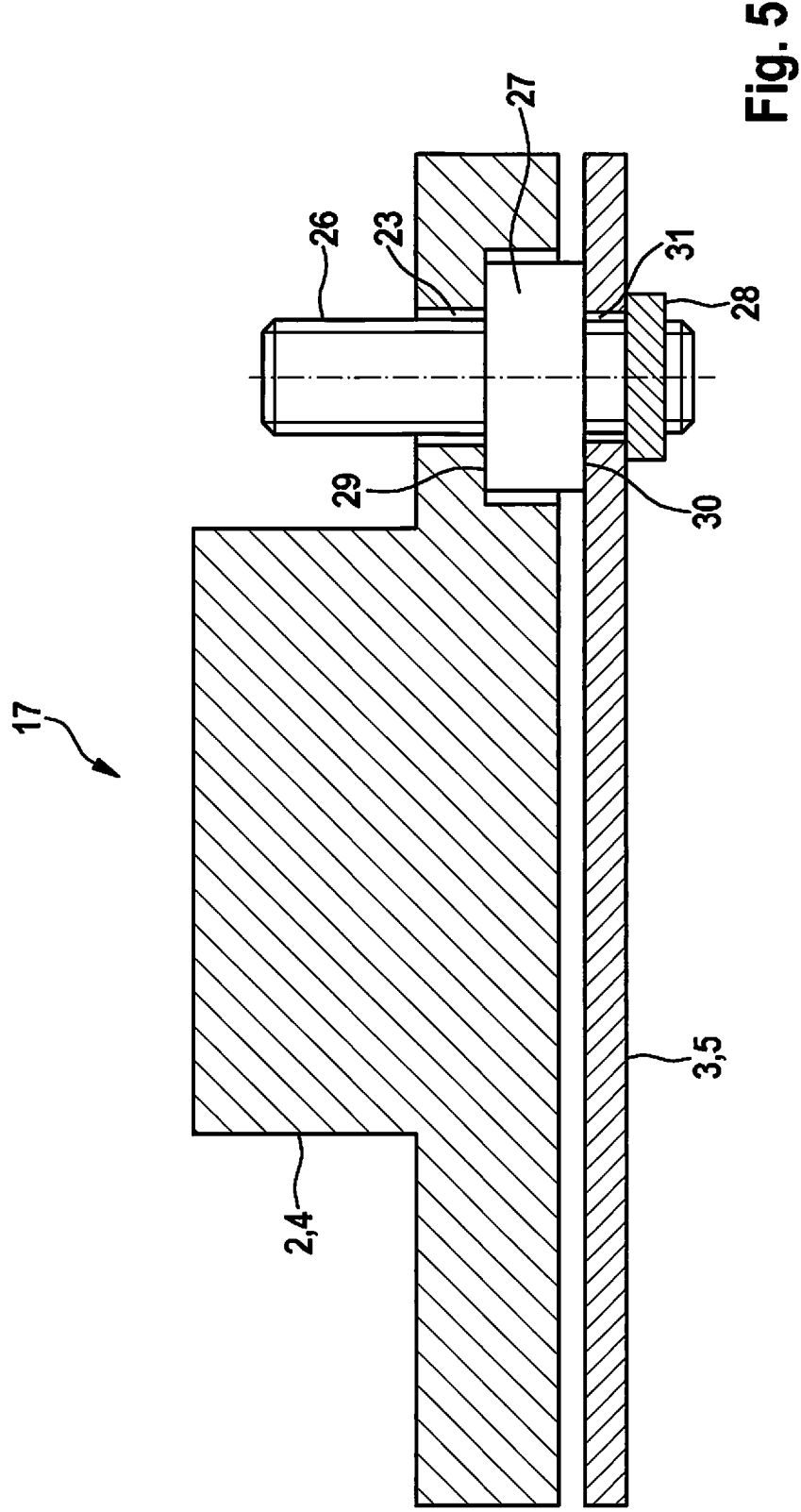

CENTERING SCREW FOR ALIGNING TWO ELEMENTS RELATIVE TO EACH OTHER, CENTERING ASSEMBLY

RELATED APPLICATION INFORMATION

The present application claims priority to and the benefit of German patent application no. 10 2018 217 375.3, which was filed in Germany on Oct. 11, 2018, the disclosure of which is incorporated herein by reference.

FIELD OF THE INVENTION

The present invention relates to a centering screw for aligning two elements, particularly a workpiece and a carrier, relative to each other, the centering screw having a first end section with a first outside diameter and a first length, as well as a second end section with a second outside diameter and a second length, the first end section having a first thread, at least in sections, and a cone being provided for the centering.

In addition, the invention relates to a centering assembly having a first element, particularly a workpiece, a second element, particularly a carrier, and having a centering screw, the first element and the second element being aligned relative to each other by the centering screw.

BACKGROUND INFORMATION

Centering screws in various types and forms are known from the related art. Centering screws usually have a centering pin section with a cone in order to fix a workpiece precisely in position with small tolerance dimensions. By using centering screws when securing a workpiece, especially when fixing a workpiece in position, it is possible to obtain the desired precision with respect to the position of the workpiece on a carrier. In order for the workpiece to be secured, especially fixed in position, with a small tolerance, very high dimensional accuracy of the components is necessary. In this context, the centering screw is screwed into the workpiece or carrier and the pin section of the centering screw is inserted with a precise fit into a centering opening provided for it in the carrier or in the workpiece.

SUMMARY OF THE INVENTION

The present invention having the features set forth herein has the advantage that a centering screw is provided for aligning two elements relative to each other and for securing the two elements relative to each other, which allows the two elements to be centered and secured precisely relative to each other in reliable manner, especially even upon repeated securing in exactly the same position.

The centering screw according to the present invention for aligning two elements, particularly a workpiece and a carrier, relative to each other, having the features set forth in claim 1 is characterized in that the centering screw has the cone in an intermediate section between the first end section and the second end section, the cone having a diameter changing along the intermediate section, the diameter at an end of the cone facing away from the first end section being larger than the first outside diameter, and the end of the cone facing away from the first end section being assigned an axial stop facing away from the first end section. This permits two elements to be secured precisely, particularly to be fixed precisely in position relative to each other, in a manner that is reliable and easy for the user. In particular, a cone is understood to be an element which has the shape of a cone or truncated cone. Centering is understood specifically to be the precise placement, especially the precise placement and securing, of two elements, particularly a workpiece relative to a carrier. An axial stop is understood specifically to be an element of the centering screw which limits the point and/or the position up to which an element is able to move, especially the position up to which the second element is able to move in the direction of the centering screw and/or the centering screw is able to move in the direction of the second element. The axial stop may be ring-shaped. By preference, the axial stop is formed integrally with the centering screw. Alternatively, the axial stop may be formed as a separate element which is disposed at the end of the cone facing away from the first end section. The centering screw expediently allows the first element to be aligned precisely and secured precisely, especially to be fixed in position precisely on the second element. Advantageously, the fixation of the two elements may easily be released again. Due to the advantageous design of the centering screw, the first thread of the centering screw is on the side of the cone facing the first end section, so that when screwing the centering screw into a mating thread, the cone is drawn into the element having the thread, and the centering screw is thereby centered on this element, especially workpiece or carrier. Thus, centering is accomplished during the threading-in process, so that the centering screw is aligned by being screwed in. This ensures simple and reliable alignment of the centering screw with the one element which the axial stop is facing. The other element, especially the workpiece or carrier, may be able to be slipped on until it comes to rest against the axial stop. By preference, the cone is formed in such a way that in the threaded-in state, it projects axially from the one element, so that the other element abuts only against the axial stop, but not against the one element. Advantageous mounting of the elements on each other is thereby ensured, because the mounting and the centering of the centering screw are not influenced by a direct contact of the seating surfaces of the elements against each other. In this context, which may be the outside diameter of the second end section is selected depending on an opening in the other element, so that they are able to be plugged advantageously into each other with only slight play, especially without play. For example, the second end section is able to be welded, clamped or screwed together with the other element.

According to one further development of the invention, the second end section has a second thread, at least in sections. This permits reliable joining of the second end section to the second element. Namely, the second thread ensures that a retaining nut is able to be screwed on the second end section in order to secure the other element to the one element, as already mentioned above. To that end, in particular, the second end section is formed with an axial length such that it projects through the second element.

According to one further development of the invention, the first outside diameter corresponds to the second outside diameter. This allows the centering screw to be produced particularly easily and inexpensively.

According to one development of the invention, the first outside diameter and the second outside diameter are of different size. Thus, the end sections may be adapted optimally to different boundary conditions.

According to one development of the invention, the end face of the cone facing the second end section forms the axial stop. The cone itself thus forms the axial stop with its backside, so that the second element is able to be slipped onto the centering screw up to the backside of the cone, that is, up to the end face of the cone facing the second end section. This ensures a particularly compact formation of the centering screw.

According to one further development of the invention, the axial stop is formed by an especially annular radial projection disposed on the second end section. Thus, the axial stop is not formed by the cone itself, but rather by a radial projection formed separately from the cone. The radial projection lies on or upon the second end section and therefore set apart from the cone, so that, e.g., a larger distance between the two elements may be produced in an easy manner.

According to one further development of the invention, the radial projection is formed in one piece with the second end section. Consequently, later attachment of the radial section to the second end section, which in particular can lead to inaccuracy of the position of the radial section, is not necessary. Namely, a precise position of the radial projection is thereby possible.

According to one development of the invention, the radial projection projects axially from the end of the cone in the direction of the second end section. This allows the radial projection to support itself axially against the cone or even to be formed in one piece with it. The radial projection therefore elongates the cone axially in the direction of the second end section, whereby the distance of the elements to each other is determined. In particular, the axial length of the radial projection is predetermined as a function of the distance desired between the elements in the mounted state. The radial projection may extend in a ring shape over the periphery of the centering screw, so that it forms an annular axial stop for the second element. Alternatively, the radial projection extends only in sections over the periphery of the centering screw. In particular, a plurality of such projections are distributed over the periphery of the centering screw, and together form the axial stop. In this context, the outside diameter of the radial projection may correspond to the outside diameter of the cone at the end face facing the second end section. Alternatively, the radial projection is formed with a smaller outside diameter or with a larger outside diameter than the outside diameter of the cone.

The centering assembly according to the present invention having the features set forth herein is characterized by the formation of the centering screw having the features set forth herein. In particular, the advantages which were already explained in connection with the centering screw are thereby obtained for the centering assembly. Namely, the precise alignment of the two elements relative to each other is made possible by the centering assembly. The centering screw may be secured to the second element with the aid of a second threaded connection. By preference, the centering screw is secured to the second element by a retaining nut. The centering screw may be secured to the second element by a material-locking connection, particularly by a welded connection or a bonded connection.

According to one further development, the first element has a conical centering depression whose cone shape corresponds at least for the most part to the cone of the centering screw, the centering depression merging into a bore hole for receiving the first end section of the centering screw. This allows the first element to be disposed particularly precisely on the centering screw and to be secured, especially fixed in position, precisely on the second element. By tightening the centering screw on the first element, the cone is drawn into the conical centering depression, and the centering screw is aligned with and positioned precisely on the first element. In particular, the screw coupling is carried out in a manner that the first end section of the centering screw projects through the first element, and on the side facing away from the cone, is able to be secured to the first element by a retaining nut which is screwed onto the first end section, the first element being clampable between the retaining nut and the cone. Alternatively, the bore hole for receiving the first end section has a mating thread that interacts with the thread of the first end section, so that the centering screw is able to be screwed directly into the mating thread, that is, into the first element, and draws the cone into the centering depression. The centering screw is thereby aligned precisely with the first element. The cone may be formed in such a way relative to the cone-shaped centering depression that in the state when it is drawn to the maximum into the centering depression, it projects from the first element. This ensures that the second element, which is aligned with the first element by the centering screw, does not rest on the first element, but rather rests against the axial stop or the cone, set apart from the first element.

According to one further development of the invention, the bore hole has an internal thread which interacts with the first thread of the centering screw. This enables the centering screw to be screwed directly into the first element, and upon being screwed in, to thus be aligned with the first element with the aid of the cone and the centering depression.

According to one development of the invention, the first end section projects through the bore hole and interacts with a retaining nut on the side of the first element facing away from the cone. Thus, it is possible to dispense with the thread in the first element, thereby reducing manufacturing costs and extra work.

According to one further development of the invention, the second element has an opening for the at least essentially zero-play accommodation of the second end section of the centering screw. It is thereby possible to dispose the centering screw, with the first element secured to the centering screw, on the second element, or to dispose the centering screw, with the second element secured to the centering screw, on the first element.

According to one development of the present invention, the first element has an elongated hole having an at least sectionally conical cross-section for receiving a further centering screw according to the invention. In this way, the first element, whose maneuver clearance is restricted by the centering bore and is only able to rotate about the longitudinal axis of the centering screw relative to the second element, is prevented from a rotational motion. The position of the first element relative to the second element is thereby fixed in the longitudinal and transverse directions. The length of the elongated hole may be adjusted according to the requirements. The elongated hole may have a conical form, whose cone shape corresponds at least essentially to the cone of the centering screw. In this way, the angle of rotation of the first element is able to be adjusted or set particularly precisely.

According to one further development of the invention, the first element has a further opening for receiving a retaining screw in a manner allowing radial play, the retaining screw having at least one radial projection which forms an axial stop for each of the elements. The first element is thereby fixed or located in position relative to the second element in the vertical direction, as well. The retaining screw may be a further centering screw having the features set forth herein. Due to the locating in position in the vertical direction, the fixation of the rotational position and the centering with the aid of the centering screw, an unambiguous and precise mounting of the first element on the second element is ensured.

Further features and advantages are derived especially from the previous description as well as from the descriptions herein.

The invention is explained in greater detail below on the basis of an exemplary embodiment.

BRIEF DESCRIPTION OF THE DRAWINGS

FIG. 4 shows another schematic sectional view of the centering assembly.

FIG. 5 shows a further schematic sectional view of the centering assembly.

DETAILED DESCRIPTION

Figure 1:
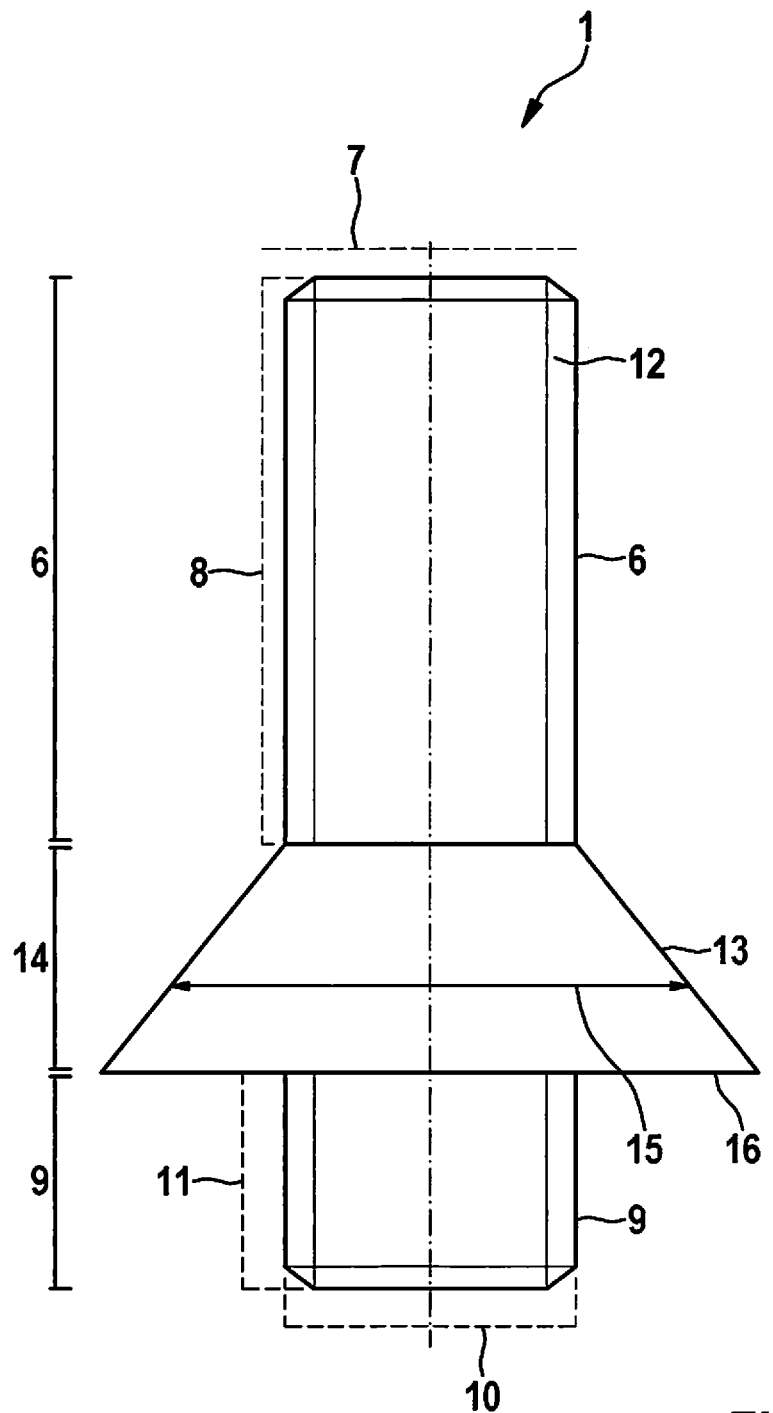
FIG. 1 shows a schematic representation of a centering screw in one exemplary embodiment.

FIG. 1 shows a schematic representation of a centering screw 1 for aligning two elements 2, 3, particularly a workpiece 4 and a carrier 5, relative to each other in an exemplary embodiment, centering screw 1 having a first end section 6 with a first outside diameter 7 and a first length 8, as well as a second end section 9 with a second outside diameter 10 and a second length 11, first end section 6 having a first thread 12, at least in sections, and a cone 13 being provided for the centering. Centering screw 1 has cone 13 in an intermediate section 14 between first end section 6 and second end section 9. Cone 13 has a diameter 15 changing along intermediate section 14, diameter 15 at an end of cone 13 facing away from first end section 6 being larger than first outside diameter 7. The end of cone 13 facing away from first end section 6 is assigned an axial stop 16 facing away from first end section 6. Optionally, in the present case, second end section 9 has a second thread, at least in sections. First outside diameter 7 in this case corresponds to second outside diameter 10. In an alternative exemplary embodiment not shown here, first outside diameter 7 and second outside diameter 10 are of different size. In the present case, the end face of cone 13 facing second end section 9 forms axial stop 16. Alternatively, axial stop 16 is formed by an especially annular radial projection disposed on second end section 9. The radial projection may be formed in one piece with second end section 9. Optionally, the radial projection projects axially from the end of cone 13 in the direction of second end section 9. Centering screw 1 ensures that first element 2, namely workpiece 4, is aligned and secured precisely, in particular is fixed in position on second element 3, namely carrier 5. At the same time, centering screw 1 especially makes it possible for first element 2 to be released from second element 3, and for first element 2 to be aligned and secured precisely again, particularly fixed in position, with second element 3 in exactly the same position.

Figure 2:
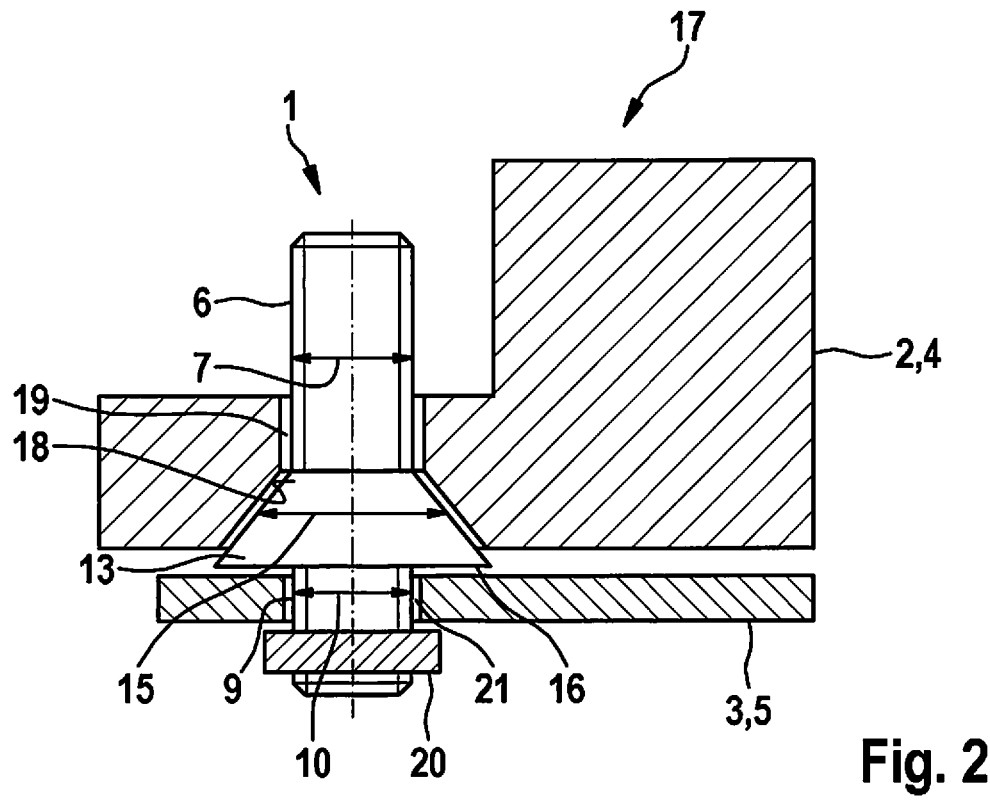
FIG. 2 shows a schematic sectional view of a centering assembly having the centering screw in an exemplary embodiment.

FIG. 2 shows a schematic sectional view of a centering assembly 17 with centering screw 1 in an exemplary embodiment. Identical and functionally identical elements are provided with the same reference numerals, so that in this respect, reference is made to the preceding description. Centering assembly 17 has a first element 2, particularly a workpiece 4, a second element 3, particularly a carrier 5, and has centering screw 1 according to FIG. 1, first element 2 and second element 3 being aligned relative to each other by centering screw 1. In this case, first element 2 to be fixed in position is not joined directly to second element 3, but rather element 2 rests on the side of cone 13 of centering screw 1 facing first end section 6. First element 2 is rotatable radially about the longitudinal axis of centering screw 1. In the present case, first element 2 has a conical centering depression 18 whose cone shape corresponds at least for the most part to cone 13 of centering screw 1. Centering depression 18 in this case merges into a bore hole 19 for receiving first end section 6 of centering screw 1. In this instance, bore hole 19 has an internal thread which interacts with first thread 12 of centering screw 1. In the present case, first end section 6 projects through bore hole 19. As an alternative to the internal thread, first end section 6 may interact with a retaining nut 20 on the side of first element 2 facing away from cone 13. In this case, second element 3 has an opening 21 for the at least essentially zero-play accommodation of second end section 9 of centering screw 1. Second end section 9 projects through opening 21 and interacts with a retaining nut 20 on the side of second element 3 facing away from cone 13.

Figure 3:
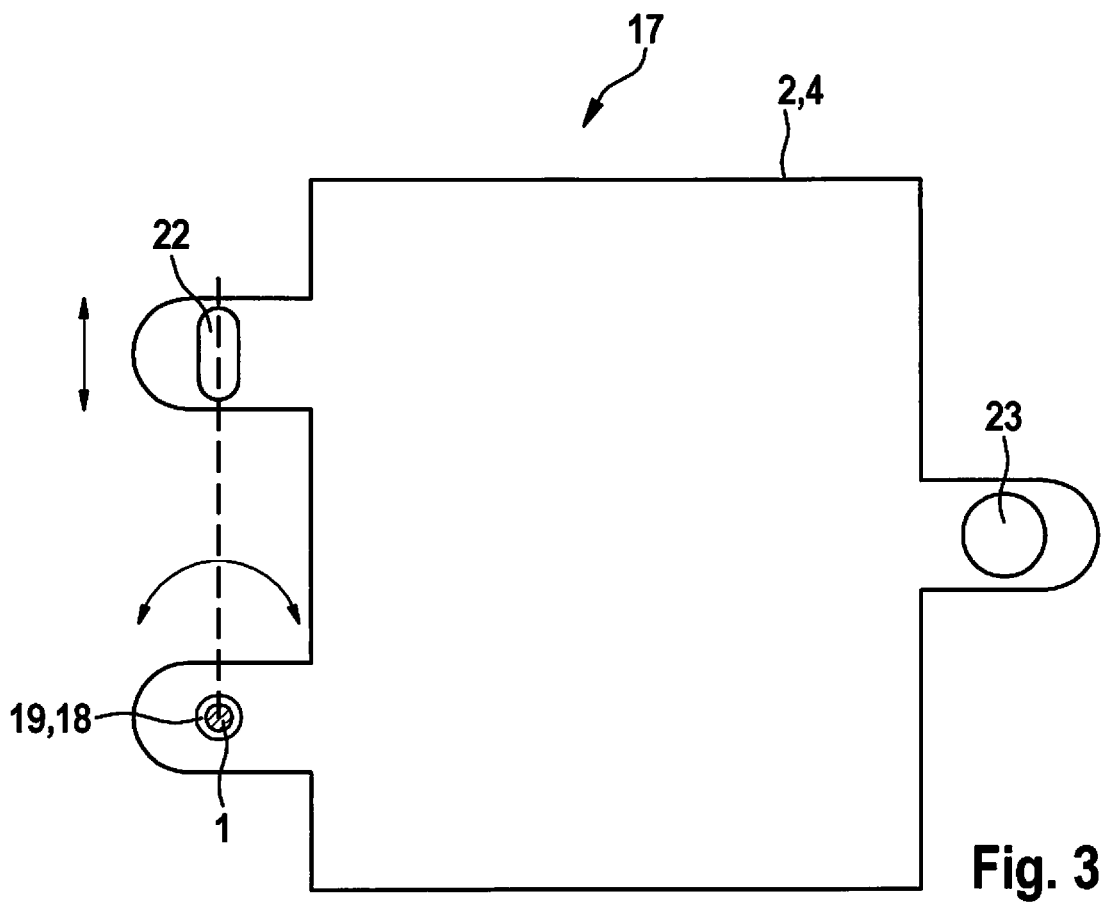
FIG. 3 shows a schematic top view of the centering assembly.

FIG. 3 shows a schematic top view of centering screw 1 in an exemplary embodiment. Identical and functionally identical elements are provided with the same reference numerals, so that in this respect, reference is made to the preceding description. Second element 3 is not visible in FIG. 3. Additional attachment points are provided to further fix first element 2 in position on second element 3 according to FIG. 2. In this case, first element 2 has an elongated hole 22 having an at least sectionally conical cross-section for receiving a further centering screw 1 set apart from bore hole 19, as shown enlarged in FIG. 4. Freedom of movement is thereby ensured in the longitudinal direction of elongated hole 22, and restricted perpendicular to the longitudinal extension. The position of first element 2 is thus fixed reliably with second element 3 in the longitudinal and transverse directions. In this case, the shape of elongated hole 22 is such that it corresponds essentially to cone 13 of centering screw 1.

In the present case, first element 2 has a further opening 23 for receiving a retaining screw 26 in a manner allowing radial play, retaining screw 26 having at least one radial projection 27 that forms an axial stop for each of elements 2, 3, as shown in detail in FIG. 5. The position of first element 2 relative to second element 3 is thereby fixed in the vertical direction, as well.

Centering screw 1 and/or centering assembly 17 may be used, for example, to fix initial sensors [sic] in position in vehicles. The requirements in respect to the installation position, especially the precise alignment and exact position, of sensors are particularly high in the case of autonomous driving, which is why the precise alignment and the exact position when securing sensors are of crucial importance, particularly in the case of autonomous vehicles.

FIG. 4 shows a schematic sectional view of centering assembly 17 with first element 2 and second element 3, at the level of elongated hole 22 according to FIG. 3. In the present case, first element 2 additionally features elongated hole 22, having an at least sectionally conical cross-section for receiving further centering screw 1 according to FIG. 1. Second element 3 in this case has an opening 24 for the at least essentially zero-play accommodation of second end section 9 of centering screw 1. In the present case, second end section 9 projects through opening 24 and interacts with a retaining nut 25 on the side of second element 3 facing away from cone 13. The position of first element 2 is thus fixed with second element 3 in the longitudinal and transverse directions of centering screw 1.

FIG. 5 shows a schematic sectional view of centering assembly 17 with first element 2 and second element 3 at the level of opening 23 according to FIG. 3. In the present case, first element 2 additionally has opening 23 for receiving a retaining screw 26 in a manner allowing radial play, retaining screw 26 having at least one radial projection 27 that forms an axial stop 29, 30 for each of elements 2, 3. The position of first element 2 relative to second element 3 is thereby fixed in the vertical direction, as well. In the present case, retaining screw 26 projects through opening 23 of first element 2. Retaining screw 26 in this case projects through an opening 31 and interacts with a retaining nut 28 on the side of second element 3 facing away from radial projection 27.

What is claimed is:

1. A centering screw for aligning two elements relative to each other, comprising:
   a first end section with a first outside diameter and a first length;
   a second end section with a second outside diameter and a second length, wherein the first end section has a first thread, at least in sections; and
   a cone provided for the centering, wherein the centering screw has the cone in an intermediate section between the first end section and the second end section, the cone having a diameter changing along the intermediate section, the diameter at an end of the cone facing away from the first end section being larger than the first outside diameter, and the end of the cone facing away from the first end section being assigned an axial stop facing away from the first end sections;
   wherein the centering screw is for aligning the two elements, and
   wherein the axial stop is formed by an annular radial projection disposed on the second end section.

2. The centering screw of claim 1, wherein the second end section has a second thread, at least in sections.

3. The centering screw of claim 1, wherein the first outside diameter has a first outside center, wherein the second outside diameter has a second outside center, and wherein for centering the first outside diameter and the second outside diameter, a longitudinal axis passes through both the first outside center and the second outside center.

4. The centering screw of claim 1, wherein the first outside diameter and the second outside diameter are different sizes.

5. The centering screw of claim 1, wherein the end face of the cone facing the second end section forms the axial stop.

6. The centering screw of claim 1, wherein the two elements include a workpiece and a carrier.

7. A centering screw for aligning two elements relative to each other, comprising:
   a first end section with a first outside diameter and a first length;
   a second end section with a second outside diameter and a second length, wherein the first end section has a first thread, at least in sections; and
   a cone provided for the centering, wherein the centering screw has the cone in an intermediate section between the first end section and the second end section, the cone having a diameter changing along the intermediate section, the diameter at an end of the cone facing away from the first end section being larger than the first outside diameter, and the end of the cone facing away from the first end section being assigned an axial stop facing away from the first end section;
   wherein the centering screw is for aligning the two elements, and
   wherein the radial projection is formed in one piece with the second end section.

8. A centering screw for aligning two elements relative to each other, comprising:
   a first end section with a first outside diameter and a first length;
   a second end section with a second outside diameter and a second length, wherein the first end section has a first thread, at least in sections; and
   a cone provided for the centering, wherein the centering screw has the cone in an intermediate section between the first end section and the second end section, the cone having a diameter changing along the intermediate section, the diameter at an end of the cone facing away from the first end section being larger than the first outside diameter, and the end of the cone facing away from the first end section being assigned an axial stop facing away from the first end section;
   wherein the centering screw is for aligning the two elements, and
   wherein the radial projection projects axially from the end of the cone in the direction of the second end section.

9. A centering assembly, comprising:
   a first element, which is a workpiece;
   a second element, which is a carrier; and
   a centering screw, wherein the first element and the second element are aligned relative to each other by the centering screw;
   wherein the centering screw is for aligning the first element and the second element relative to each other, and includes:
   a first end section with a first outside diameter and a first length;
   a second end section with a second outside diameter and a second length, wherein the first end section has a first thread, at least in sections; and
   a cone provided for the centering, wherein the centering screw has the cone in an intermediate section between the first end section and the second end section, the cone having a diameter changing along the intermediate section, the diameter at an end of the cone facing away from the first end section being larger than the first outside diameter,
   and the end of the cone facing away from the first end section being assigned an axial stop facing away from the first end section;
   wherein the first element has a conical centering depression whose cone shape corresponds at least for the most part to the cone of the centering screw, the centering depression merging into a bore hole for receiving the first end section of the centering screw.

10. The centering assembly of claim 9, wherein the bore hole has an internal thread which interacts with the first thread of the centering screw.

11. The centering assembly of claim 9, wherein the first end section projects through the bore hole and interacts with a retaining nut on the side of the first element facing away from the cone.

12. The centering assembly of claim 9, wherein the second element has an opening for the at least essentially zero-play accommodation of the second end section of the centering screw.

13. A centering assembly, comprising:
a first element, which is a workpiece;
a second element, which is a carrier; and
a centering screw, wherein the first element and the second element are aligned relative to each other by the centering screw;
wherein the centering screw is for aligning the first element and the second element relative to each other, and includes:
a first end section with a first outside diameter and a first length;
a second end section with a second outside diameter and a second length, wherein the first end section has a first thread, at least in sections; and
a cone provided for the centering, wherein the centering screw has the cone in an intermediate section between the first end section and the second end section, the cone having a diameter changing along the intermediate section, the diameter at an end of the cone facing away from the first end section being larger than the first outside diameter,
and the end of the cone facing away from the first end section being assigned an axial stop facing away from the first end section;
wherein the first element has an elongated hole having an at least sectionally conical cross-section for receiving a further centering screw, and
wherein the further centering screw includes:
a first end section with a first outside diameter and a first length;
a second end section with a second outside diameter and a second length, wherein the first end section has a first thread, at least in sections; and
a cone provided for the centering, wherein the centering screw has the cone in an intermediate section between the first end section and the second end section, the cone having a diameter changing along the intermediate section, the diameter at an end of the cone facing away from the first end section being larger than the first outside diameter,
and the end of the cone facing away from the first end section being assigned an axial stop facing away from the first end section.

14. A centering assembly, comprising:
a first element, which is a workpiece;
a second element, which is a carrier; and
a centering screw, wherein the first element and the second element are aligned relative to each other by the centering screw;
wherein the centering screw is for aligning the first element and the second element relative to each other, and includes:
a first end section with a first outside diameter and a first length;
a second end section with a second outside diameter and a second length, wherein the first end section has a first thread, at least in sections; and
a cone provided for the centering, wherein the centering screw has the cone in an intermediate section between the first end section and the second end section, the cone having a diameter changing along the intermediate section, the diameter at an end of the cone facing away from the first end section being larger than the first outside diameter,
and the end of the cone facing away from the first end section being assigned an axial stop facing away from the first end section;
wherein the first element has a further opening for receiving a retaining screw in a manner allowing radial play, the retaining screw having at least one radial projection which forms an axial stop for each of the elements.

* * * * *